June 8, 1965     B. A. BRAUNBERGER     3,187,773
QUICK DISCONNECT COUPLING

Filed Nov. 6, 1962     3 Sheets-Sheet 1

INVENTOR.
BENJAMIN A. BRAUNBERGER
BY
William F. Woods
ATTORNEY

INVENTOR.
BENJAMIN A. BRAUNBERGER
BY William F. Woods
ATTORNEY

United States Patent Office 3,187,773
Patented June 8, 1965

3,187,773
QUICK DISCONNECT COUPLING
Benjamin A. Braunberger, St. Louis, Mo.
(713 5th St. SW., Minot, N. Dak.)
Filed Nov. 6, 1962, Ser. No. 235,766
11 Claims. (Cl. 137—614.04)

This invention relates to a coupling for joining conduits under fluid pressure; in particular, it concerns a new and improved quick disconnect hydraulic coupling adapted for use in high pressure applications and operable to automatically interrupt fluid flow upon the separation of the coupling members.

In couplings adapted to handle high pressure fluid flow in applications such as farm machinery, aircraft hydraulic systems and the like, the problem of stopping the fluid flow through a conduit upon the separation of the conduit is one of the main considerations facing a designer. In many situations, as for example, in the case of an hydraulically actuated cylinder mounted upon a tractor drawn implement that is supplied with fluid from a pump on the tractor, the fluid line is designed to separate upon the striking of an object or due to some other unforeseen circumstance. When such a separation occurs, the fluid flow must be stopped immediately to prevent excessive fluid losses as well as to respond to the new condition. A coupling designed for such uses must also be adapted for easy and reliable connection so that the time consumed in hooking up the equipment is kept to a minimum.

Recent increases in the operating pressures of the systems described have made it incumbent to obtain a quick disconnect coupling that can be connected and disconnected with a minimum of leakage in spite of the high pressure ranges (in the order of 2,000 to 3,000 p.s.i.) involved. To accomplish this result the coupling elements should be equipped with identical mating internal parts to avoid high manufacturing costs and lessen the chance of operational failures. And means for transferring hand produced essentially axial forces to the internal coupling members whereby to effectuate an effective and reliable seal is necessary to obtain optimum results.

While various prior art devices have attempted to meet this problem, most of them are characterized by complicated internal structure utilizing manual force to lock the coupling halves into a sealed pressure tight connection. Under high pressure conditions, many of these couplings have been known to fail and, moreover, are quite expensive to build and maintain in proper operating condition. In addition, the force required to operate them is quite high making them difficult to manage under normal field conditions.

It is, therefore, a broad object of this invention to provide a quick disconnect coupling that will overcome the disadvantages and limitations listed above.

Another important object of this invention is to provide a quick disconnect coupling that will meet the above mentioned requirements of structure and function.

Another object of this invention is to provide a quick disconnect coupling adapted to handle high pressure fluid flow without structural failure and adapted for positive connection and disconnection with a minimum of manual effort and fluid loss.

Yet another object of this invention is to provide a quick disconnect coupling having novel means for exerting a large mechanical advantage upon the coupled members upon the application of relatively small manual forces.

Still another object of this invention is to provide in a quick disconnect coupling novel means for sealing the internal coupling members.

Another object of this invention is to provide in a quick disconnect coupling, novel internal and outer structure adapted to maintain a pressure tight fluid connection in a conduit and adapted to be easily disconnected without appreciable fluid loss.

A further object of this invention is to provide a quick disconnect coupling adapted for high pressure application that can be easily manufactured, is reliable in operation and extremely rugged in design.

Another object of this invention is to provide in a quick disconnect coupling compact structure characterized by novel means for engaging and disengaging the coupling elements of the coupling and adapted for use with conventional fluid conduit fittings.

Yet another object of this invention is to provide in a quick disconnect coupling means for automatically opening a fluid passageway upon the engagement of the coupling members in combination with novel means for quickly and effectively sealing off the fluid passageway upon the disengagement of the coupling members.

Still another object of this invention is to provide in a quick disconnect coupling novel means for abuttingly sealing the coupling when it is in an engaged fluid conducting condition.

With the foregoing and other objects in view, which will appear as the description proceeds, the invention consists of certain novel features of construction, arrangement and a combination of parts hereinafter fully described, illustrated in the accompanying drawings, and particularly pointed out in the appended claims, it being understood that various changes in the form, proportion, size and minor details of the structure may be made without departing from the spirit or sacrificing any of the advantages of the invention.

For the purpose of facilitating an understanding of the invention, there is illustrated in the accompanying drawings a preferred embodiment thereof, from an inspection of which, when considered in connection with the following description, the invention, its mode of construction, assembly and operation, and many of its advantages should be readily understood and appreciated.

Referring to the drawings in which the same characters of reference are employed to indicate corresponding or similar parts throughout the several figures of the drawings.

Figure 1:
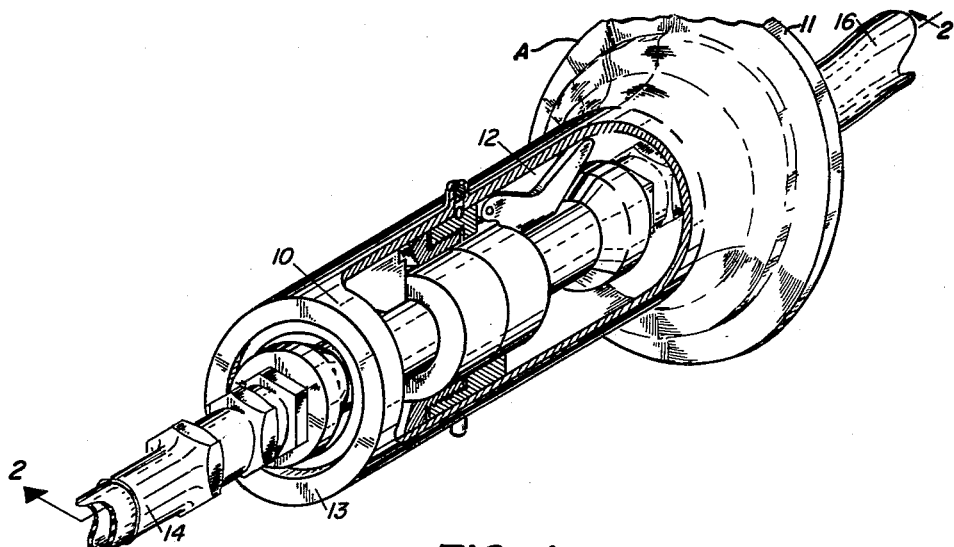
FIGURE 1 is a perspective view with parts cut away of the invention illustrating its connection in a fluid pressure line.

Referring now to the drawings, the invention, indicated in its entirety by the reference character A, includes a hollow generally cylindrical outer housing 10 having at one end thereof an enlarged flared end 11 in communication with a smooth internal bore 12. The end of housing 10 opposite from flared end 11 is equipped with an annular shoulder 13 of lesser diameter than the diameter of housing 10 and flush with the end thereof. Housing 10 with its flared end 11 and shoulder 13 constitutes a static coupling member adapted to enclose and support the internal parts forming the fluid connection for pressure lines 14, 16, as will be explained. Pressure line 14 will be referred to as a pump hose and pressure line 16 will be referred to as a cylinder hose for the purpose of clarity. The configuration of the inner contour of flared end 11 is designed to afford a camming action between the sliding dog members of the locking assembly used to connect, seal and operate the internal pressure nipples, as will become apparent as the description proceeds. For the purpose of establishing the constructional details of flared end 11, it will be noted that there is provided an outer flange 15 that is connected to the straight side wall of housing 10 by intermediate inclined sections 17, 18, in communication with bore 12 of housing 10. Located intermediate the ends of housing 10 are a plurality of circumferentially spaced radial bosses 19 having apertures 20 in radial communication with internal bore 12. Positioned within each of the bosses 20 are a ball 21, spring 22 and cap screw 23 constituting ball retainer means for the internal components, as will be pointed out.

Figure 4:
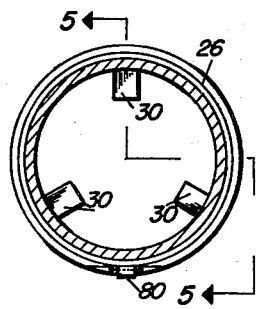
FIGURE 4 is a view, partially in section, taken substantially along the line 4—4 of FIGURE 2.
Figure 5:
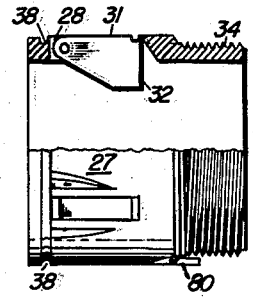
FIGURE 5 is a view, partially in section and with parts broken away, taken substantially along the line 5—5 of FIGURE 4.

Slidably mounted for axial movement within housing 10 is a hollow generally cylindrical rear linking sleeve 26, the details of which are shown in FIGURES 4 and 5. Body 27 of sleeve 26 is provided with three circumfertially spaced longitudinal slots 28 into which are pivotally mounted forwardly extending generally wedge shaped identical dogs 30, the outer edges 31 thereof being generally coplanar with the outer surface of sleeve 26 when sleeve 26 is slidably positioned within housing 10. The body of each dog 30 extends radially within sleeve 26 and is so constructed as to present a generally radial forwardly abutting end 32 in axially spaced parallel relation to shoulder 13 of housing 10. Sleeve 26 is also provided with an externally threaded end portion 34 of reduced diameter. A shallow annular retainer groove 38 is milled into sleeve 26 between dogs 30 and the rear end thereof.

Figure 6:
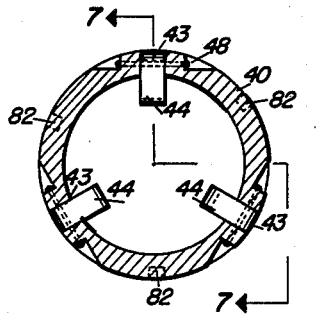
FIGURE 6 is a view, partially in section, taken substantially along the line 6—6 of FIGURE 2.
Figure 7:
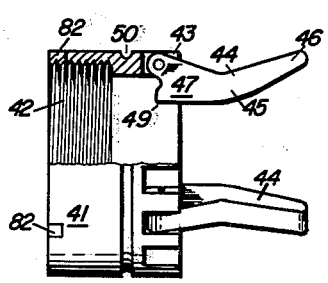
FIGURE 7 is a view, partially in section and with portions broken away, taken substantially along the line 7—7 of FIGURE 6.

A hollow generally cylindrical forward linking sleeve 40, more particularly shown in FIGURES 6 and 7, is characterized by a body 41 of the same external diameter as sleeve 26 and having an internally threaded rear portion 42 adapted to threadedly engage sleeve 26. Arranged in a circumferential manner in communication with the forward end of sleeve 40 are three recesses 43 into which are pivotally mounted identical operating dogs 44. Dogs 44 are designed to coact with the aforementioned inner contours 15, 17 and 18 of flared end 11, as will be explained. Their structure consists of a curved shank 45 having an elongated forward end 46 connected to body 47 which is pivotally carried within recesses 43 by means of pins 48. The undersurface of body 47 is characterized by a generally radially extending shoulder 49 integral with shank 45 and forward end 46 of dog 44. A shallow annular retainer groove 50 is milled into the periphery of sleeve 40 between threaded portion 42 and recesses 43 thereof.

Further provided are a pair of identical pressure nipples 60' adapted for positioning within linking sleeves 26, 40 and connected to pump hose 14 and cylinder hose 16, respectively. Pressure nipple 60 is illustrated in detail in FIGURE 3, it being understood that nipple 60' is exactly equivalent in structure thereto but positioned within sleeves 26, 40 in an end to end abutting relationship therewith.

Figure 2:
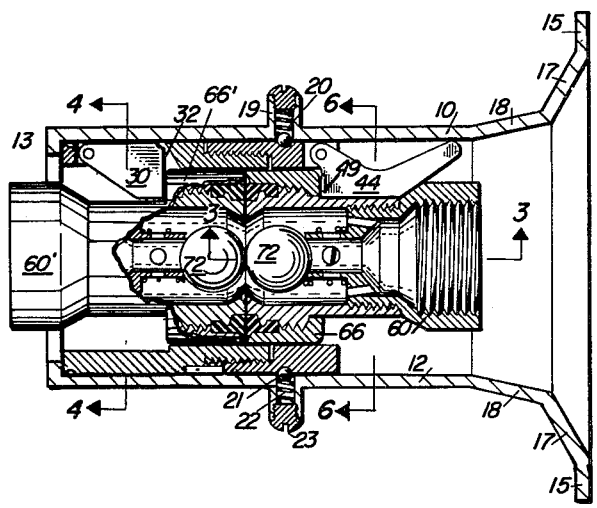
FIGURE 2 is a side elevational view, partially in section, taken substantially along the line 2—2 of FIGURE 1.
Figure 3:
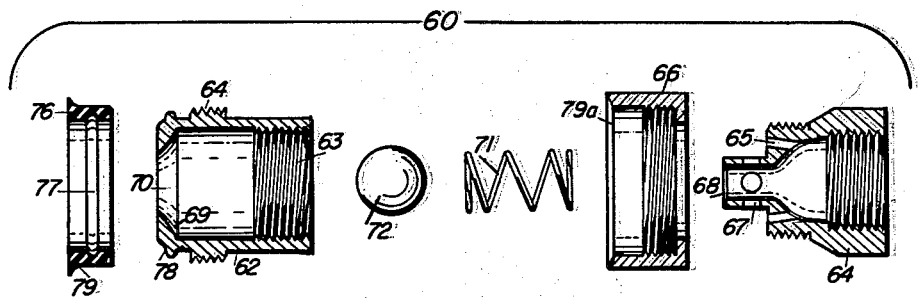
FIGURE 3 is an exploded view, partially in section, of certain internal components of the invention located generally along the line 3—3 of FIGURE 2.

As indicated in FIGURE 3, nipple 60 consists of a nipple valve 62 having internal threads 63 adapted to threadedly receive adapter 61 at the rear end thereof and external threads 64 adapted to threadedly mount collar 66 on the forward end thereof. The internal bore of adapter 64 is characterized by fluid ports 65 in communication with hollow shank 67 having a ball stop 68 at the end thereof. A radial shoulder is provided between shank 67 and the body of adapter 64. The bore of nipple valve 62 is tapered at the forward end thereof, as at 69, to provide a passageway 70 of reduced diameter and seat ball check member 72. A compression spring 71 abuttingly engages the shoulder and surrounds shank 67 of adapter 64 to normally urge ball check member 72 in a forward direction to close and seal off passageway 70. As shown in FIGURE 2, balls 72, 72' rest against stops 68, 68' and coact wtih each other against springs 71, 71' to open an annular passageway 70 when the coupling is in a fluid conducting condition. Carried on the forward end of valve 62 is an annular resilient butt sealing member 76 having an internal circumferential groove 77 adapted to engage an external circumferential shoulder 78 formed on valve body 62. The forward end of sealing member 76 is equipped with a slightly flared wedge-shaped shoulder 79 adapted to engage a corresponding bevelled edge 79a formed in the forward periphery of collar 66. Under operating conditions, the internal fluid pressure acts to force shoulder 79 against edge 79a to increase the sealing engagement between members 76, 76'.

As indicated in FIGURE 2, nipples 60 and 60' are positioned within housing 10 in slidable engagement with forward linking sleeve 40 and rear linking sleeve 26, respectively. It can be seen that when the device is in an operative fluid conducting condition, collar 66' of nipple 60' is in axial abutting engagement with radial surface 32 of dogs 30, while collar 66 of nipple 60 is likewise held in an axial direction by shoulder 49 of dogs 44.

The mechanics involved in providing a sufficient axially directed force between dogs 30 and 44 of sleeves 26, 40, respectively, to effect a proper seal between abutting seals 76, 76' and at the same time open passageways 70, 70' by the co-axial reaction between ball check members 72, 72' against the pressure of springs 71, 71', will now be described.

Basically, the pressure tight connection achieved between nipples 60, 60' within sleeves 26 and 40 is accomplished by forcing them together in an axial direction. To get the mechanical advantage necessary to seal the unit under high pressure conditions with ordinary hand pressure, the length of dog 44 from pin 48 to its end 46 (represented by reference character B in FIGURE 12) is approximately four times the length of the distance from pin 48 to shoulder 49 (represented by reference character C in FIGURE 12) resulting in a mechanical advantage of 4:1 in addition, inclined surface 18 of flared end 11 is sloped at a 3:1 rate resulting in a combined MA of about 12:1.

Figure 8:
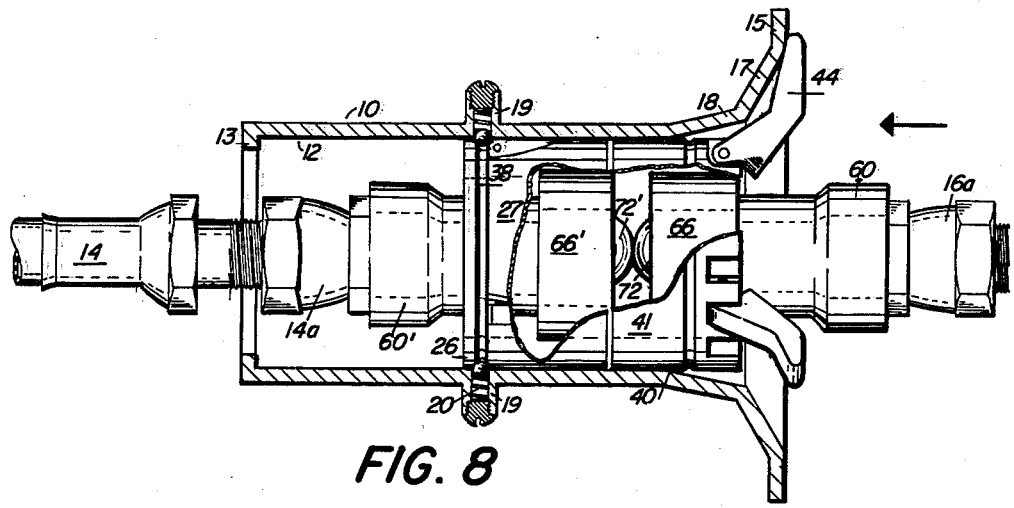
FIGURE 8 is a view, partially in section and with portions broken away illustrating the couplings in a disconnected position.

Referring to FIGURE 8, it can be seen that sleeve 26 is held by retainer balls 21 intermediate the length of housing 10. In this position, ends 46 of dogs 44 are in initial contact with outer flange 15 of flared end 11 and balls 72, 72' are in abutting coaxial relation with each other by virtue of the insertion of nipple 60 within linking sleeve 40. Nipple 60' is prevented from axial movement relative to rear linking sleeve 26 by the contact of dogs 30 with collar 66'. Forward linking sleeve 40 is threadedly secured to rear linking sleeve 26 so that an axial thrust imparted thereto in the direction of rear linking sleeve 26 results in the coaction between shoulders 49 of dogs 44 to cause relative motion between sleeve 40 and nipple 60 to bring nipple 60 in the direction of nipple 60'.

Figure 9:
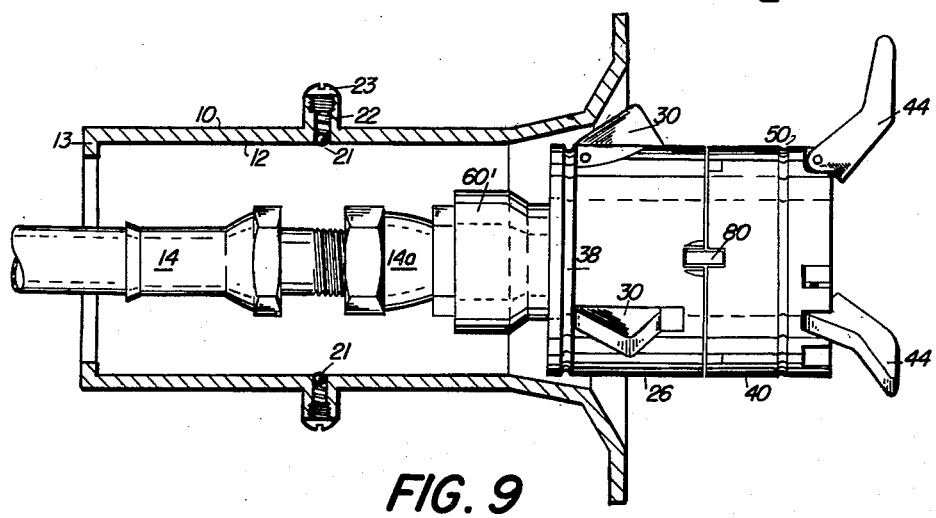
FIGURE 9 is a view, similar to FIGURE 8, illustrating the couplings being removed from their housings.
Figure 12:
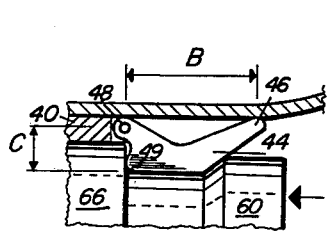
FIGURE 12 is a view similar to FIGURES 10 and 11 illustrating the final step in the coaction of the coupling dog members with the connecting housing.
Figures 10, 11:
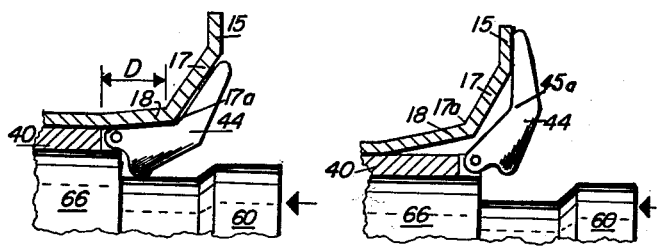
FIGURE 10 is a fragmentary view, partially in section, illustrating the initial coaction of the coupling dog members with the connecting housing pursuant to the movement of the coupling members into sealing engagement with each other therewithin.
FIGURE 11 is a view similar to FIGURE 10 illustrating an intermediate step in the action of the coaction coupling dog members with the connecting housing.

Thus when an axially directed force is applied, as by manually gripping hose 16 and forcing it in the direction indicated by the arrow in FIGURES 8, 10-12, dogs 44 operate in the following manner: Initially when end 46 of dog 44 is in contact with surface 15 of flared end 11, the relative motion produced by the interaction between shoulder 49 and collar 66 of nipple 60 causes ball check members 72, 72' to open one another against their respective spring pressures. As the sliding motion of sleeve 40 proceeds, the concave apex or corner 45a of dogs 44 comes in contact with the corner 17a defined between inclined sections 17 and 18 of flared end 11 reducing the driving radius B (FIGURE 12) to a lesser radius D (indicated in FIGURE 11) causing an acceleration of nipple 60 towards 60' whereby to hold spillage to a minimum during the interval of time between the opening of passageway 70 and the sealing of butt sealing members 76, 76'. As the motion continues, end 46 of dogs 44 engage inclined surface 18 of flared end 11 yielding an increased mechanical advantage to compress sealing members 76, 76' whereby to achieve a tight leakproof joint therebetween. Final connection occurs as end 46 of dogs 44 engages the straight inner bore 12 of housing 10 (FIGURE 12). At this point, the mechanical advantage described is increased to infinity, with the axial force required being only that necessary to overcome the friction between the sliding parts 26, 40 and 10. To prevent normal operating hose tension from breaking the connection, retainer balls 21 engage groove 50 of linking sleeve 40. When it is desired to break the connection, it is only necessary to pull hose 16 with sufficient manual force to disengage balls 21 from groove 50 of sleeve 40. When this is done, sleeves 26 and 40 are displaced toward flared end 11 and dogs 44 release their hold upon collar 66 allowing balls 72, 72' to interrupt fluid flow. The displacement of the inner assembly from housing 10 is prevented by the engagement of balls 21 in grooves 38 of rear linking sleeve 26. To remove the entire assembly from housing 10 additional axial force can be applied to sleeves 26, 40 so that balls 21 are released from groove 38 and sleeves 26, 40 are then moved towards flared end 11. As shown in FIGURE 9, when dogs 30 of sleeve 26 reach flared end 11, they are in a position to disengage collar 66' therefrom so that hose 14 and its nipple 60' may be removed through the rear of housing 10, if desired.

The threaded connection between sleeve 26 and sleeve 40 allows for the adjustment of the pressure between opposed resilient sealing members 76, 76'. To lock sleeve 26 and sleeve 40 into a desired axial relationship, a locking finger 80 is pivotally mounted in a generally longitudinal recess 81 upon the periphery of body 27 of sleeve 26 (FIGURE 5) adjacent threaded portion 34 thereof. Corresponding recesses 82 are located in body 41 of sleeve 40 adjacent the rear end thereof. The outer surface of finger 80 is normally coplanar with the outer surface of sleeves 26, 40, with the forward end of finger 80 being engageable with recesses 82 in sleeve 40 to afford means for locking sleeves 26, 40 into a desired axial position. This feature permits the taking up of any wear that may occur upon the surfaces of collars 66, 66', dogs 44 and dogs 30 while at the same time permitting adjustment of the pressure exerted between sealing members 76, 76'.

It is believed that the invention, its mode of construction and assembly, and many of its advantages should be readily understood from the foregoing without further description, and it should also be manifest that while a preferred embodiment of the invention has been shown and described for illustrative purposes, the structural details are nevertheless capable of wide variation within the purview of the invention as defined in the appended claims.

I claim:

1. In a quick disconnect coupling adapted to axially displace a pair of identical opposed mating pressure nipples having self-sealing internal valve means operable to permit fluid flow therethrough when said nipples are in abutting contacting relation to each other, the combination of:
   an outer static coupling member,
      said coupling member having an internal longitudinal passageway in communication with a flared end,
   a hollow body slidably positionable within said coupling member adapted to slidably mount therein the said pressure nipples,
   and pivotal dog means on said body,
      said dog means including a plurality of circumferentially arranged lever arms,
         said lever arms each including a relatively short nipple engaging portion and an elongated driving portion engageable with the flared end of said coupling member adapted to impart accelerated forces to said nipples and permit fluid flow therethrough when said body is slidably positioned within said coupling member from the flared end thereof.

2. In a quick disconnect self-sealing hose coupling adapted to axially displace a pair of identical opposed mating pressure nipples having helf-sealing internal valve means operable to permit fluid flow therethrough when said pressure nipples are in abutting contacting relation to each other, the combination of:
   an outer housing,
      said outer housing being hollow and having a flared end,
   a hollow body slidably contained within said outer housing and adapted to slidably mount therein said pressure nipples,
   annular resilient butt sealing means secured to each of said pressure nipples adapted to abuttingly engage each other to prevent fluid escape within said body when said pressure nipples are in a fluid conducting open position, and
   pivotal dog means carried by said body engageable with the flared end of said outer housing operable upon the application of an axially directed force to said body to engage at least one of said pressure nipples to bring said pressure nipples into abutting contacting relation with each other and impart sealing pressure to said butt sealing means.

3. The device of claim 2 wherein said pivotal dog means includes a plurality of circumferentially arranged pivotal arms each engageable at one end with the flared end of said outer housing and at the outer housing and at the other end with said body to effect tight sealing fluid connection within said coupling.

4. In a quick disconnect coupling adapted to axially displace a pair of identical opposed mating pressure nipples having self-sealing internal valve means operable to permit fluid flow therethrough when said nipples are in abutting contacting relation to each other, the combination of:
   an outer hollow housing having an internal shoulder at one end and being flared generally radially outwardly at the opposite end,
   a first linking sleeve positionable within said housing in abutting relationship to the shoulder thereof,
   a second linking sleeve secured to said first linking sleeve,
      said linking sleeves slidably mounting therein the said pressure nipples in endwise abutting engagement with each other, annular butt sealing means secured to the abutting ends of said pressure nipples for preventing fluid flow between said nipples and said linking sleeves when the internal valve means of said nipples are open, and driving dog means mounted on said second linking sleeve in axially spaced relation to said first linking sleeve operable to engage at one end thereof the flared end of said outer housing and at the other end thereof one of said pressure nipples whereby to drive the said pressure nipple into abutting engagement with the other pressure nipple and seal said butt sealing means.

5. The device of claim 4 wherein one of the said pressure nipples is restrained from axial movement by a plurality of stop dogs hingedly carried by said first linking sleeve.

6. The device of claim 4 wherein said second linking sleeve is threadedly connected to said first linking sleeve and wherein means are provided for locking said sleeves together against tightening or untightening movements.

7. The device of claim 4 wherein said butt sealing means consists of a pair of identical opposed annular resilient members each having a radial contact face.

8. The device of claim 4 wherein means are provided for releasably holding said linking sleeves against axial movement within said outer housing.

9. In a quick disconnect coupling adapted to axially displace a pair of identical opposed mating pressure nipples having self-sealing internal valve means operable to permit fluid flow therethrough when said nipples are in abutting contacting relation to each other, the combination of:

a hollow outer static coupling member having a flared end, a hollow body positionable within said coupling member adapted to slidably mount therein said pressure nipples, a plurality of circumferentially spaced lever arms pivotally carried at one end of said body, said lever arms each including a relatively short pressure nipple engaging portion adjacent its pivot axis and an elongated driving portion extending on the opposite side of the said pivot axis from said nipple engaging portion, the said driving portion of said lever arms being operable to slidably engage the flared end of said coupling member when said body is slidably introduced thereinto whereby to accelerate the axial closure of said pressure nipples.

10. The device of claim 9 wherein said pressure nipples are each equipped with an annular butt sealing member, each of said butt sealing members being in axial abutting engagement with each other when said pressure nipples are forced into a fluid conducting condition.

11. The device of claim 10 wherein said pressure nipples are each equipped with bevelled edges and wherein said butt sealing members are provided with wedge-shaped shoulders sealingly engageable with the said edges when said nipples are in a fluid conducting condition.

References Cited by the Examiner
UNITED STATES PATENTS

| | | | |
|---|---|---|---|
| 410,032 | 8/89 | Scoville | 137—614.03 |
| 2,512,999 | 6/50 | Bruning | 137—614.04 |
| 2,637,572 | 5/53 | Bruce | 137—614.02 |
| 2,643,140 | 6/53 | Scheiwer | 285—277 |
| 2,660,456 | 11/53 | Meddock | 137—614.04 |
| 2,706,646 | 4/55 | Olson | 137—614.04 |

WILLIAM F. O'DEA, *Primary Examiner.*